UNITED STATES PATENT OFFICE 2,345,170

PROCESS OF MAKING ACETYLENIC CARBINOLS

Joseph Zeltner and Michailas Genas, Paris, France; vested in the Alien Property Custodian No Drawing. Application March 29, 1940, Serial No. 326,804. In France June 16, 1939

5 Claims. (Cl. 260—638)

It is known that acetylenic carbinols can be obtained by the action of substances possessing a carbonyl group =C=O, either on the acetylides of alkali metals, or on organo-metallic derivatives of acetylene or substitution products of the latter.

The first method offers serious drawbacks for carrying it out industrially, since it requires very low temperatures, of the order of —30° to —40° C., solvents such as liquid ammonia, and the use of expensive products such as metallic sodium or sodium amide.

The second method, that is to say the preparation by means of organo-metallic substance, is practically inapplicable industrially.

It has also been proposed to obtain acetylenic carbinols, such as phenylacetylene carbinol, by reacting phenylacetylene with ketones of the general formula $R^1$—CO—$R^2$ in the presence of powdered caustic potash, the products resulting from this reaction being carbinols of the general formula:

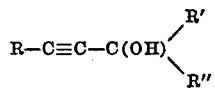

It has also been proposed to replace the substitution products of acetylene by acetylene itself. This reaction was effected in the presence of ethyl ether as a solvent. But this solvent has serious drawbacks from the industrial standpoint, owing to its volatility, its inflammability and the dangers of explosion that may be caused by the formation of peroxides. This danger may be increased, in the applications in question, since said peroxides may react with the acetylene compounds formed and produce substances which are particularly explosive.

We have found, and this is what the invention consists in, that the reaction of acetylene with products of the group consisting of the aliphatic aldehydes and ketones, in the presence of solid caustic potash, for forming acetylenic carbinols, can be effected in certain solvents, other than ethyl ether, which do not have the serious drawbacks of the latter.

The solvents which enable the reaction in question to be effected are acetals (hereinafter called active solvents).

In order that the reaction shall take place under satisfactory conditions and with maximum efficiency, it is preferable to mix the caustic potash beforehand with the above mentioned active solvents, at a suitable temperature which depends on the nature of the solvent. I have found that this method of proceeding favours the subsequent formation of the potassium derivative i. e. potassium acetylide.

It is advisable to form a certain quantity of this potassium derivative by introducing a part of the acetylene before beginning to introduce the aliphatic aldehyde or ketone to be combined therewith.

We then continue to introduce the acetylene.

Example 1

175 parts of powdered caustic potash are mixed with 250 parts of dimethylformal, performing the function of an active solvent, at a temperature of about 15° C., and the temperature is allowed to rise to about 30–35° C. The mixture is cooled to about 0° C., then about 10 parts of acetylene are introduced. Then 60 parts of acetone are gradually added and a further 23 parts of acetylene.

The potassium derivative of the corresponding acetylene carbinol is formed:

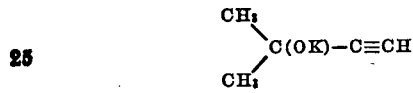

Decomposition is effected with water and, after the evolution of the excess of acetylene and the separation of the aqueous layer, the solvent is separated from the carbinol formed, by distillation.

About 80 parts of carbinol are obtained, whereof the boiling point is 104–106° C.

Example 2

175 parts of powdered caustic potash are mixed with 500 parts of dimethylformal, at a temperature of about 15° C. and the temperature is allowed to rise to about 30–35° C. The mixture is cooled to about 0° C., then about 20 parts of acetylene are introduced. 45 parts of acetaldehyde in solution in 100 parts of dimethylformal are then gradually added, and the introduction of acetylene is simultaneously continued. After adding 10 parts of acetylene, the reaction product is decomposed with water, and the operation is continued as in Example 1.

Methyl-acetylenyl-carbinol having the formula:

is thus obtained, whereof the boiling point is 103–105° C.

Of course, the examples given are purely explanatory and in no way limitative, and it will be obvious to those skilled in the art that various changes and modifications may be made therein without departing from the invention, and it is therefore aimed in the appended claims to cover all such changes and modifications as fall within the true spirit and scope of the invention.

We claim:

1. The process of manufacturing an acetylenic carbinol by reacting acetylene with a member of the group consisting of aliphatic aldehydes and ketones in the presence of solid potassium hydroxide in a solvent medium including, the step of effecting the reaction in an acetal as a solvent.

2. The process of manufacturing an acetylenic carbinol by mixing solid potassium hydroxide in dimethylformal, and introducing acetylene and acetone into the mixture.

3. The process of manufacturing an acetylenic carbinol by mixing solid potassium hydroxide in dimethylformal, introducing acetylene into the mixture and subsequently adding acetone.

4. The process of manufacturing an acetylenic carbinol by mixing solid potassium hydroxide in dimethylformal, introducing a limited portion of acetylene into the mixture, adding the desired quantity of acetone and subsequently adding acetylene to excess.

5. The process of manufacturing an acetylenic carbinol by mixing solid potassium hydroxide in dimethylformal, introducing acetylene into the mixture, subsequently effecting reaction by adding acetone, decomposing with water and separating the carbinol thus formed.

JOSEPH ZELTNER.
MICHAILAS GENAS.